UNITED STATES PATENT OFFICE.

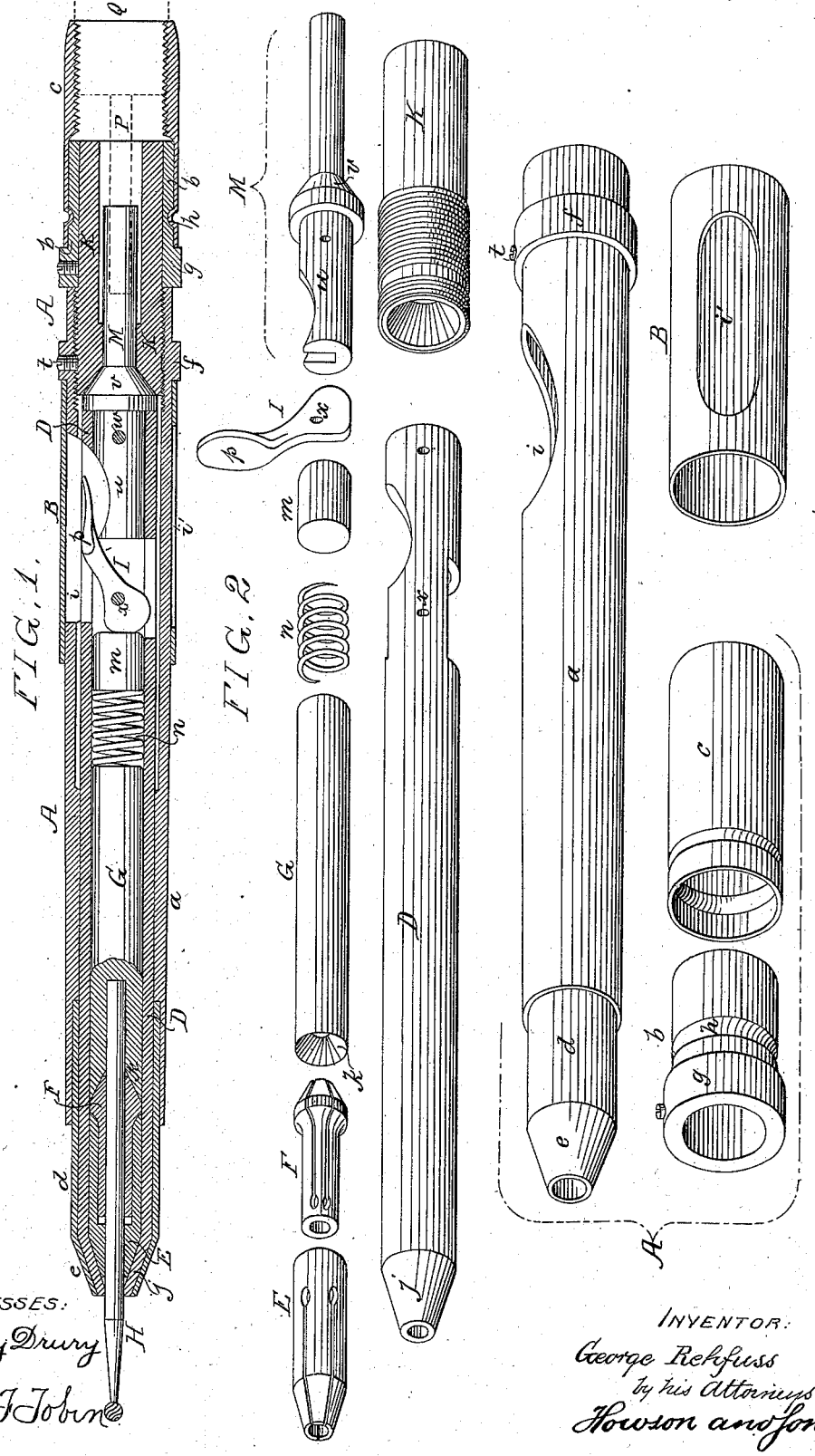

GEORGE REHFUSS, OF PHILADELPHIA, PA., ASSIGNOR TO HIMSELF, JOHN GEORGE REHFUSS, AND MARTIN O. REHFUSS, ALL OF SAME PLACE.

DENTAL HAND-PIECE.

SPECIFICATION forming part of Letters Patent No. 255,020, dated March 14, 1882.

Application filed December 22, 1881. (No model.)

*To all whom it may concern:*

Be it known that I, GEORGE REHFUSS, a citizen of the United States, and a resident of Philadelphia, Pennsylvania, have invented certain Improvements in Hand-Pieces for Dental Instruments, of which the following is a specification.

My invention relates to certain improvements, fully described hereinafter, in that class of dental instruments in which a rotating shaft provided with a removable dental tool is combined with a tube to be held in the hands of the operator; and the objects of my invention are to insure the firm griping of the dental tool, to provide means for securing and releasing the tool without any protuberances to interfere with the free manipulation of the instrument, and to make an effective, simple, and economical instrument of this class with a fewer number of parts than usual.

In the accompanying drawings, Figure 1 is a longitudinal section of my improved dental instrument, and Fig. 2 perspective views of detached parts of which the instrument is composed.

The outer casing, A, of the dental tool consists of the tube $a$, the sleeve $b$, and tube $c$. To the tube $a$, which I prefer to make of brass, is permanently secured a shorter tube or tip, $d$, of steel, which has a conical termination, $e$. The sleeve $b$ abuts against the end of the tube $a$, and the tube $c$ is arranged to fit on the sleeve $b$ as far as its collar $g$, the sleeve having an annular indentation, $h$, into which the metal of the tube $c$ is forced, so that the said tube shall be retained on the sleeve. The tube $a$ is cut away at $i$, so as to present an opening, referred to hereinafter, and a short tube, B, having a corresponding opening, $i'$, is so fitted to the tube $a$ that, while it fits snugly to the same, it can be turned thereon, so as to close or expose the opening $i$.

D is the inner casing or tubular shaft, having a conical termination, $j$, adapted to the interior of the conical tip $e$ of the outer casing. Within the tubular shaft D are two slotted griping-sleeves, E and F, the stem of the latter being arranged to fit into the body of the former. The conical end of the sleeve E is adapted to the interior of the conical termination $j$ of the tube D, and the conical end of the sleeve F to the countersunk end $k$ of a recessed rod, G, which fits snugly, but is arranged to slide freely in the tubular shaft. The cylindrical stem of a dental tool, H, is passed through the two sleeves E and F and into the recess of the rod G, and a comparatively slight end-pressure imparted to the rod G, in the manner described hereinafter, will cause both of the slotted sleeves to gripe the tool with sufficient force to prevent it from turning independently of the sleeves; at the same time the conical end of the sleeve E is so jammed into the conical interior of the end $j$ of the tubular shaft D that it cannot turn independently of the sleeves.

It should be stated here that I do not claim independently of other mechanism the two griping sleeves E and F, a part of one fitting into a part of the other, as this device is described in another application for a patent for a chuck.

A cam-lever, I, is pivoted at $x$ to the tubular shaft D, the cam portion of this lever being arranged to bear against a cylindrical block, $m$, adapted to slide in the shaft D, between which block and the rod G intervenes a spiral spring, $n$. When the arm $p$ of the cam lever is moved inward toward the center of the shaft D the tool H will be embraced by the griping-sleeves, and the entire lever will be within the limit of the said shaft and will turn with the latter, so that there will be no protuberance to interfere with the free handling of the instrument; but when the tool H has to be detached the tube B may be turned on the outer casing until the opening $i$ of the same is exposed, when the arm $p$ of the cam-lever can be moved outward, the block $m$ and rod G being consequently released from the pressure of the cam, and the two slotted sleeves will be permitted to expand and cease to gripe the tool.

A threaded tube, K, is screwed into the end of the outer casing, and is retained by a set-screw, $t$, and onto this tube is fitted and secured the above-mentioned sleeve $b$. A shaft, M, has its bearing in the tube K, the portion $u$ of this shaft fitting snugly into the end portion of the tubular shaft D, and the said portion *u* of the shaft M being cut away to admit the arm of the cam-lever I. A conical enlargement, *v*, on the shaft M has its bearing in the countersink of the tube K, and this enlargement *v* forms a collar-bearing against the end of the tubular shaft D, to which the said shaft M is secured by a pin, *w*.

The usual flexible driving-shaft P, Fig. 1, is secured to the shaft M, and the elastic shaft is contained within a flexible tube or casing, Q, (also shown by dotted lines,) this flexible tube being secured to the above-mentioned tube *c*.

The object of the spring *n*, interposed between the block *m* and rod G, may be explained as follows: While the stems of the different dental tools to be attached to the instrument should be of the same diameter, they frequently differ in this respect to a limited extent, and if the cam-lever I acted on a rigid rod it might in some cases fail to cause the griping of the stem of the tool, and in other cases might cause this griping before its arm could be forced into the interior of the tubular shaft. The presence of the spring, however, prevents this, for it will always yield to the action of the cam-lever and permit the latter to be properly operated, so as to effect the griping of different tools, even if they should vary slightly in diameter.

It will be observed that the stem of the tool is a simple straight piece of wire, which is held by friction only, no recesses or flattened portions on the stem being necessary, and owing to the double clamping-jaws the tool is firmly griped, and is properly centered and held in a position exactly parallel with the shaft D of the hand-piece.

A tool having a burr at each end can be used, if desired, the tool being reversed when one burr becomes worn out.

I claim as my invention—

1. The combination, in a dental instrument, of the following elements, namely: first, an outer casing or tube; second, a tubular shaft contained within the said tube; third, slotted griping-sleeves E and F for seizing the stem of a dental tool, the said sleeves being contained within the tubular shaft; and, fourth, devices for acting on the said sleeves, all substantially as set forth.

2. The combination of the outer casing, the tubular shaft D, griping-jaws, and rod G with a cam-lever, I, adapted to be depressed within the limit of the tubular shaft, all substantially as set forth.

3. The combination of the outer casing, tubular shaft, griping-sleeves, and rod G with the cam-lever I, block *m*, and spring *n*, substantially as specified.

4. The combination, in a dental hand-piece, of the outer casing, its sleeve *d*, having a conical termination, *e*, the shaft D, having a conical termination, *j*, the slotted griping-sleeve E, made conical at one end, the slotted griping-sleeve F, also made conical at one end, and adapted to fit in or on the sleeve F, and mechanism for acting on the said sleeves, all substantially as set forth.

In testimony whereof I have signed my name to this specification in the presence of two subscribing witnesses.

GEO. REHFUSS.

Witnesses:
HARRY DRURY,
HARRY SMITH.